(12) United States Patent
Kimura et al.

(10) Patent No.: US 6,775,125 B2
(45) Date of Patent: Aug. 10, 2004

(54) SOLID ELECTROLYTIC CAPACITOR AND METHOD OF MANUFACTURING THE CAPACITOR

(75) Inventors: Suzushi Kimura, Toyonaka (JP); Katsumasa Miki, Hirakata (JP); Yuji Mido, Higashiosaka (JP); Tatsuo Fujii, Osaka (JP); Hideki Masumi, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 4 days.

(21) Appl. No.: 10/296,258

(22) PCT Filed: Mar. 22, 2002

(86) PCT No.: PCT/JP02/02762
§ 371 (c)(1),
(2), (4) Date: Jan. 13, 2003

(87) PCT Pub. No.: WO02/078026
PCT Pub. Date: Oct. 3, 2002

(65) Prior Publication Data
US 2004/0090735 A1 May 13, 2004

(30) Foreign Application Priority Data
Mar. 23, 2001 (JP) .......................................... 2001-84785
Mar. 26, 2001 (JP) .......................................... 2001-86995

(51) Int. Cl.$^7$ .............................................. H01G 9/00
(52) U.S. Cl. ...................... 361/523; 361/502; 361/504; 361/516; 361/528; 361/529; 29/25.03
(58) Field of Search ................................. 361/523, 528, 361/502, 504, 508.512, 516, 524, 525, 529, 518, 532, 530, 434; 29/25.03

(56) References Cited

U.S. PATENT DOCUMENTS

| 5,122,931 A | * | 6/1992 | Shimada et al. ............ 361/523 |
| 5,357,399 A | * | 10/1994 | Salisbury .................... 361/529 |
| 5,377,073 A | | 12/1994 | Fukaumi et al. |
| 5,473,503 A | * | 12/1995 | Sakata et al. ................ 361/525 |
| 6,320,742 B1 | * | 11/2001 | Wada et al. ................. 361/528 |
| 6,466,430 B2 | | 10/2002 | Mido et al. |
| 6,673,389 B1 | * | 1/2004 | Huntington .................. 427/79 |

FOREIGN PATENT DOCUMENTS

| JP | 10-144573 | 5/1998 |
| JP | 11-274002 | 10/1999 |

* cited by examiner

Primary Examiner—Dean A. Reichard
Assistant Examiner—Nguyen T. Ha
(74) Attorney, Agent, or Firm—Parkhurst & Wendel, L..L.P.

(57) ABSTRACT

A solid electrolytic capacitor having a high capacitance and excellent high frequency response including a valve metal sheet which is made porous, a dielectric layer formed on the porous portion, a solid electrolyte layer formed on the dielectric layer, a collector layer and an electrode exposure area formed on the solid electrolyte layer, and an insulating section electrically insulating the electrode exposure area from the collector layer, in which the electrode exposure area and the collector layer are formed on the same surface of the valve metal sheet.

33 Claims, 24 Drawing Sheets

SOLID ELECTROLYTIC CAPACITOR AND METHOD OF MANUFACTURING THE CAPACITOR

FIELD OF THE INVENTION

The present invention relates to a solid electrolytic capacitor for use in a variety of electronic equipment and a manufacturing method thereof

BACKGROUND OF THE INVENTION

In recent years, as a reduction in size and operation at higher frequencies are required of electronic equipment, a large capacitance for the smallest possible size, a low ESR(equivalent series resistance) and a low ESL(equivalent series inductance) are required for capacitors used in electronic equipment. As a large capacitance multi-layer solid electrolytic capacitor, chip type capacitors as disclosed in the U.S. Pat. No. 5,377,073 and the Japanese Patent Laid-Open Publication No. H11-274002 have been so far known. However, these prior art solid electrolytic capacitors incorporate terminals, lead wires and the like for electric connections and also for mounting on a circuit board, resulting in forming resistance and inductance components to prevent the capacitors from reducing the ESL further.

The present invention deals with the conventional problems as described above and aims to provide a large capacitance solid electrolytic capacitor with excellent high frequency response, which can be mounted on a circuit board and directly connected with semiconductor devices, and a method of manufacturing the same.

DISCLOSURE OF THE INVENTION

The present invention discloses a capacitor element and a solid electrolytic capacitor composed of a plurality of the capacitor elements laminated on top of each other in layers, the capacitor element comprising:

a valve metal sheet having a porous section;

an electrode exposure area formed on one surface of the valve metal sheet;

a dielectric layer formed on the porous section of the valve metal sheet;

a solid electrolyte layer formed on the dielectric layer; and a collector layer formed on the solid electrolyte layer, wherein the electrode exposure area and collector layer are formed on the same surface of the valve metal sheet and electrically insulated from each other by an insulating section.

Semiconductor devices can be directly mounted on the solid electrolytic capacitor of the present invention. Thus, the capacitor does not need conventionally needed connection terminals and lead wires and has an excellent high frequency response.

Also, the present invention discloses a method of manufacturing the foregoing solid electrolytic capacitor.

BEST MODE FOR CARRYING OUT THE INVENTION

Figure 1:
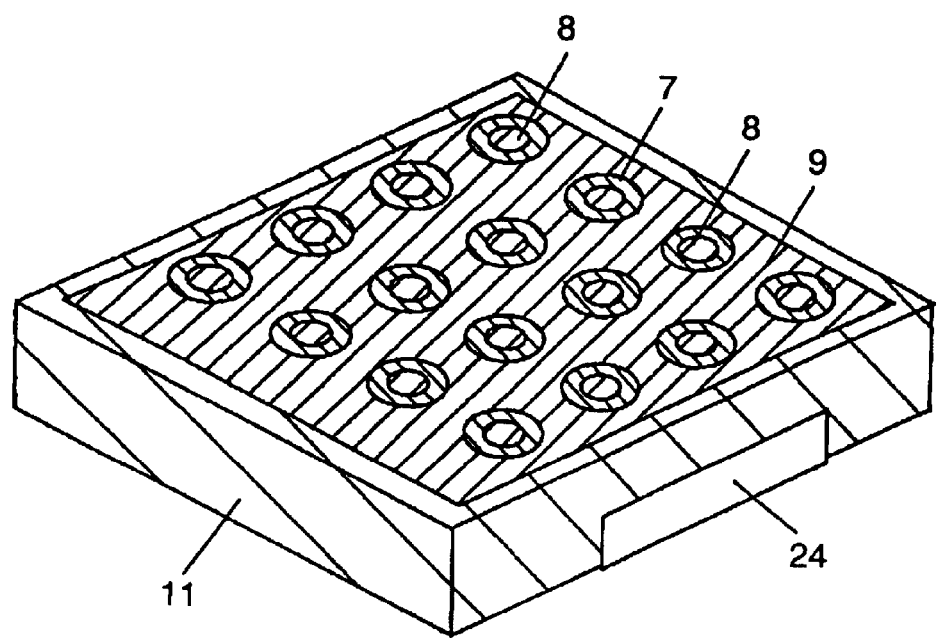
FIG. 1 is a perspective view of a solid electrolytic capacitor in exemplary embodiment 1 of the present invention.

Next, a description is given to a solid electrolytic capacitor and a manufacturing method thereof with reference to the drawings. The drawings are schematic and it should be noticed that relative dimensional relationships of the respective elements are not shown to scale.

Exemplary Embodiment 1

In FIG. 1 through FIG. 4, a capacitor element 1 comprises a valve metal sheet 3 that is made porous except for a plurality of electrode portions 2, a dielectric layer 4 formed on the porous surface of the valve metal sheet 3, solid electrolyte layers 5 formed on the dielectric layer 4, collector layers 6 formed on the solid electrolyte layer 5 and an insulating section 7 disposed between the electrode portion 2 and the collector layer 6. Here, an area where the electrode portion 2 is exposed is referred to as an electrode exposure area 25. The electrode exposure area 25 and the collector layer 6 are situated on the same surface of the valve metal sheet 3 and electrically insulated from each other by insulating section 7.

Although the capacitor element 1 functions with the aforementioned structure, it is preferred that an additional metal layer is formed on the electrode exposure area 25 to make first connection terminal 8 and another additional metal layer is formed on the collector layer 6 around the insulating section 7 to make second connection terminal 9.

Around an outer periphery of the capacitor element 1 thus structured is formed package 11 composed of epoxy resin and the like by a molding process to complete a solid electrolytic capacitor.

As the valve metal sheet 3, an aluminum foil is used and is made porous by etching except the areas corresponding to the electrode portions 2 and the dielectric layer 4 can be formed on the surface and the porous surface of the aluminum foil by anodizing in a forming solution.

Further, as the solid electrolyte layer 5, a conductive high polymer layer formed of functional polymers such as polypyrrole, polythiophene and the like formed by a chemical oxidation polymerization or by an electrolytic polymerization can be used, or a manganese dioxide layer formed by impregnating manganese nitrate solution and a following thermal decomposition, and the like can be used.

Furthermore, as the collector layer 6, a carbon layer alone or a laminated structure of a carbon layer and a silver paste layer can be used.

In addition, as the insulating section 7, a silicone resin that is excellent in printability, water repellency and the like can be used. Also, an epoxy resin and a fluorocarbon resin can be used.

In order to enhance printability, water repellency and the like, a composite with necessary additives contained can also be used.

As the first connection terminal 8 and the second connection terminal 9 metals such as copper, solder, silver, gold, nickel and the like can be used in a single layer or in a laminated structure of these metals.

Figure 4:
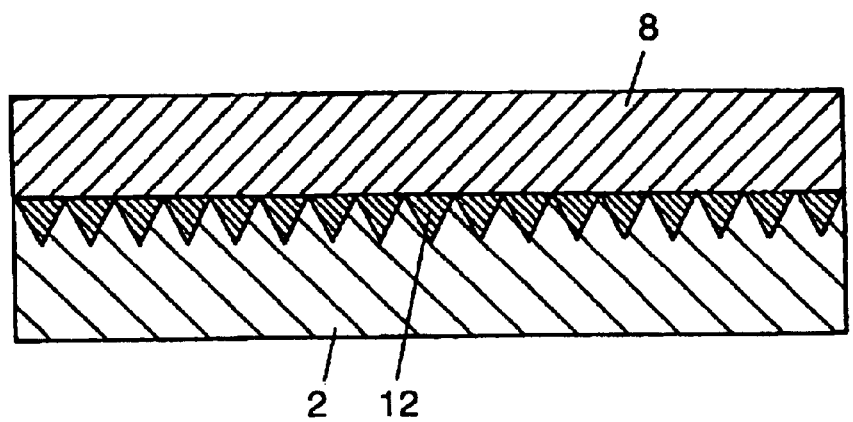
FIG. 4 is a partially enlarged cross-sectional view of the solid electrolytic capacitors in exemplary embodiment 1 and 6 of the present invention.

When the first connection terminal 8 is formed on the electrode exposure area 25, a surface roughening process to provide asperity 12 on the electrode exposure area 25, as shown in FIG. 4, strongly bonds the first connection terminal 8 to the electrode exposure area 25, thereby enabling increased reliability in electrical connection.

Figure 2:
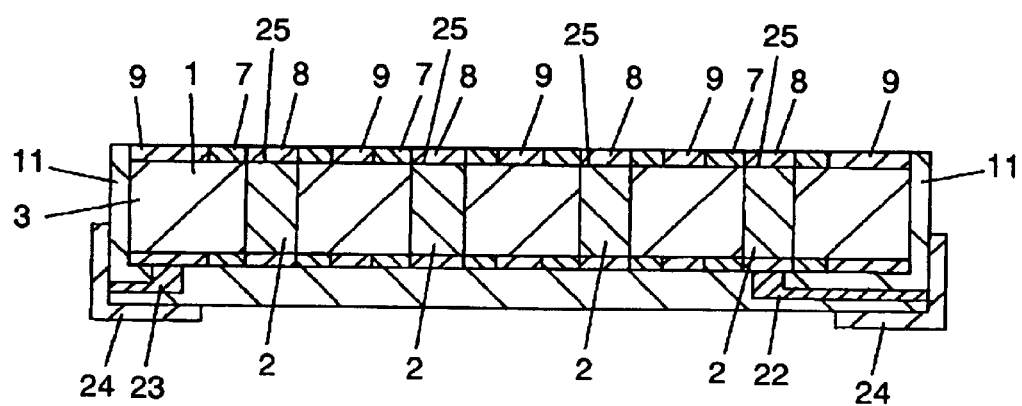
FIG. 2 is a cross-sectional view of the solid electrolytic capacitor in exemplary embodiment 1 of the present invention.
Figure 3:
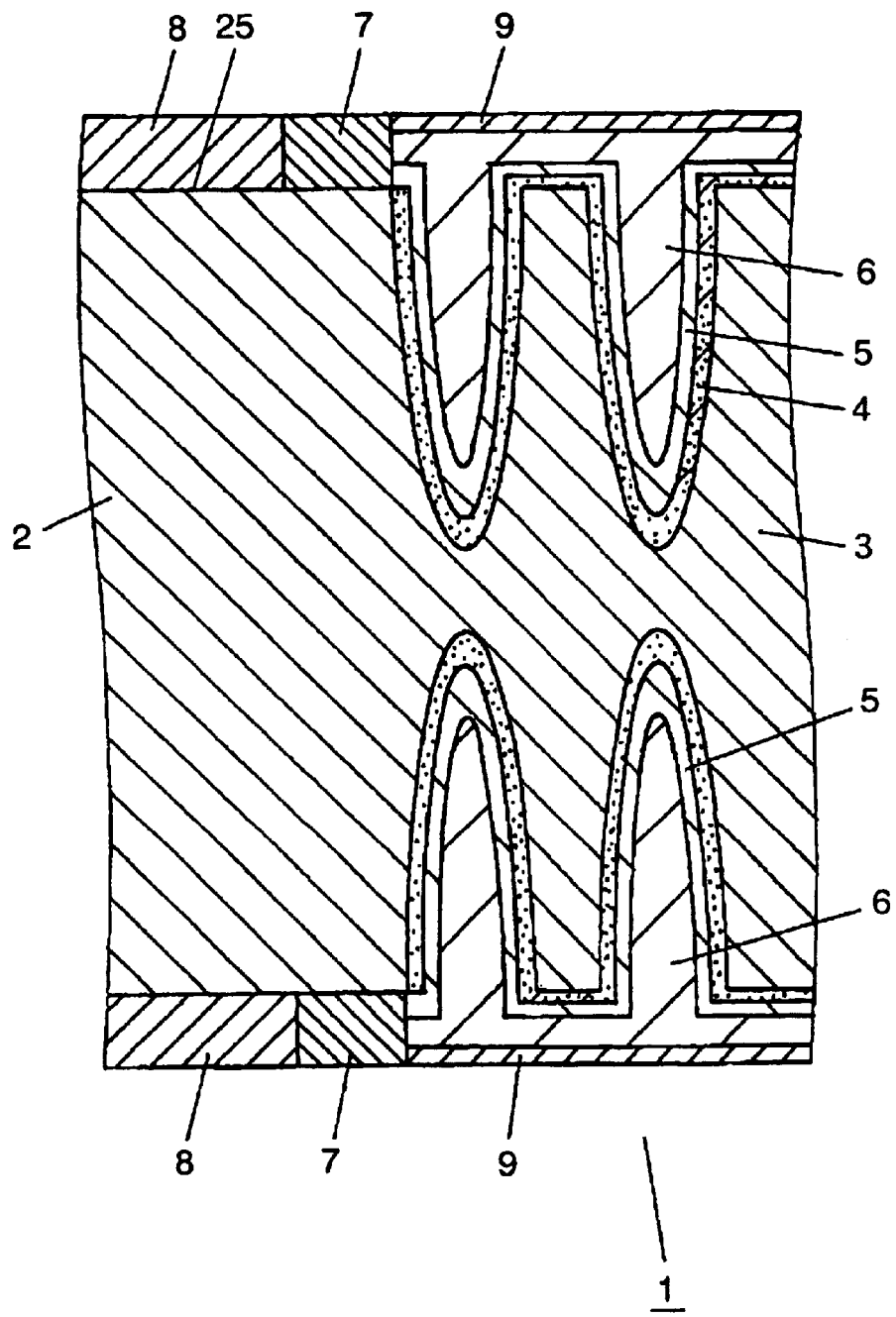
FIG. 3 is a partially enlarged cross-sectional view of the solid electrolytic capacitor in exemplary embodiment 1 of the present invention.

A solid electrolytic capacitor thus structured has a plurality of connection terminals 8 and connection terminals 9 on the upper and bottom surfaces thereof, as FIG. 1 and FIG. 2 show. This structure allows one surface thereof to be mounted with semiconductor devices and another surface to be connected to lands of a circuit board.

A number of the connection terminals 8 and 9 is made the same as a number of connecting bumps of the semiconductor devices. When the number of connection terminals 8 and 9 exceeds the number of connecting bumps of the semiconductor devices, chip type components such as chip resistors, chip capacitors, chip inductors and the like can be mounted on the one surface of the solid electrolytic capacitor in addition to the semiconductor devices, thereby allowing the whole assembly to be a circuit module.

Also, first lead out electrode 22 and second lead out electrode 23 are provided in the package beneath the bottom surface of the capacitor and are connected to external terminals 24, respectively, as required.

However, these lead out electrodes and external terminals are not necessarily required and the most appropriate structure can be employed according to a circuit design and a mounting process.

Exemplary Embodiment 2

A solid electrolytic capacitor in exemplary embodiment 2 of the present invention is similar to the one in exemplary embodiment 1 as far as the fundamental structure is concerned. A different point is to have connection bumps 13 and 14 made of gold, solder or tin provided on the first connection terminal 8 and the second connection terminal 9, respectively, so as to facilitate the connection with the semiconductor devices. In order to keep the bump pitches constant, connection bumps 13 and 14 are formed after insulating layer 16 with openings 15 provided at places, where connection bumps 13 and 14 are located, is formed.

As a result of disposing connection terminals 8 and connection terminals 9 alternately on the same surface of a sheet-like solid electrolytic capacitor, a low ESR as well as a low ESL can be obtained, thereby allowing the solid electrolytic capacitor to have an excellent high frequency response.

Figure 6:
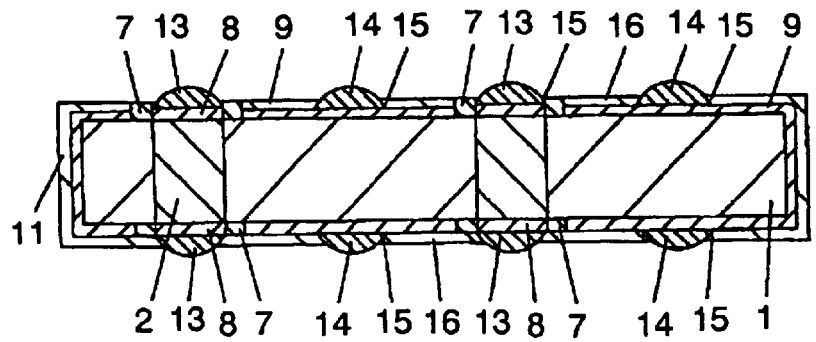
FIG. 6 is a cross-sectional view of the solid electrolytic capacitors in exemplary embodiments 2 and 7 of the present invention.

A solid electrolytic capacitor as shown in FIG. 6 is a sheet-like solid electrolytic capacitor structured to have connection bumps 13 and 14 disposed on both surfaces thereof.

It is also possible to have connection bumps 13 and 14 disposed only on the upper surface of the solid electrolytic capacitor and to have the bottom surface thereof covered with package 11 as shown in FIG. 2. This structure allows the solid electrolytic capacitor to be mounted on a circuit board of high density wiring patterns with an insulating condition maintained A description is given to another configuration of the electrode portion with reference to FIG. 7 and FIG. 8.

Figure 7:
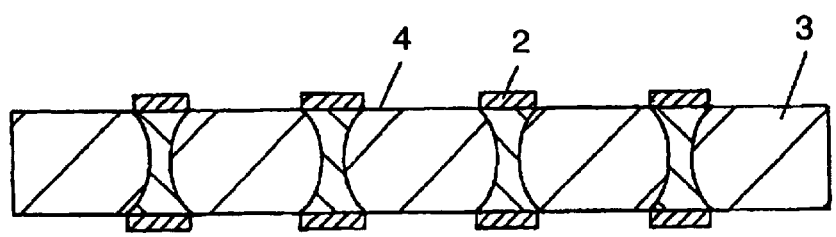
FIG. 7 is a cross-sectional view of the solid electrolytic capacitors in exemplary embodiments 2 and 7 of the present invention to show another electrode configuration.

A solid electrolytic capacitor as shown in FIG. 7 has electrode portions 2 with cross-sectional areas made smaller than the areas of the electrode exposure area 25 in the valve metal sheet 3, thereby allowing the capacitance of the capacitor to increase. The crossectional area of the electrode portions 2 can be controlled by controlling the etching conditions of the valve metal sheet.

Figure 8:
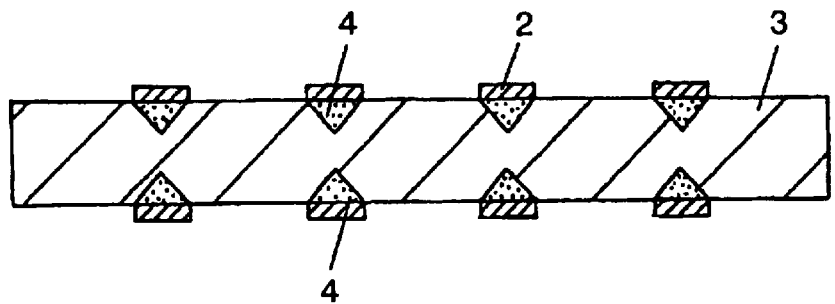
FIG. 8 is a cross-sectional view of the solid electrolytic capacitors in exemplary embodiments 2 and 7 of the present invention to show still another electrode configuration.

The electrode portion 2 shown in FIG. 8 is formed so as to extend to an arbitrary depth in valve sheet metal 3, thereby allowing the capacitance of the capacitor to increase further.

Accordingly, the solid electrolytic capacitor in the present exemplary embodiment is allowed to have semiconductor devices mounted thereon and also to be easily mounted on a circuit board due to the provision of the connection terminals 8 and 9 and the connection bumps 13 and 14 disposed thereon, respectively. And this structure contributes to obtaining a large capacitance capacitor with the smallest possible configuration in comparison with the prior art capacitors. As a result, considerable progress is made toward a size reduction and enhanced mounting efficiency.

Exemplary Embodiment 3

Figure 9:
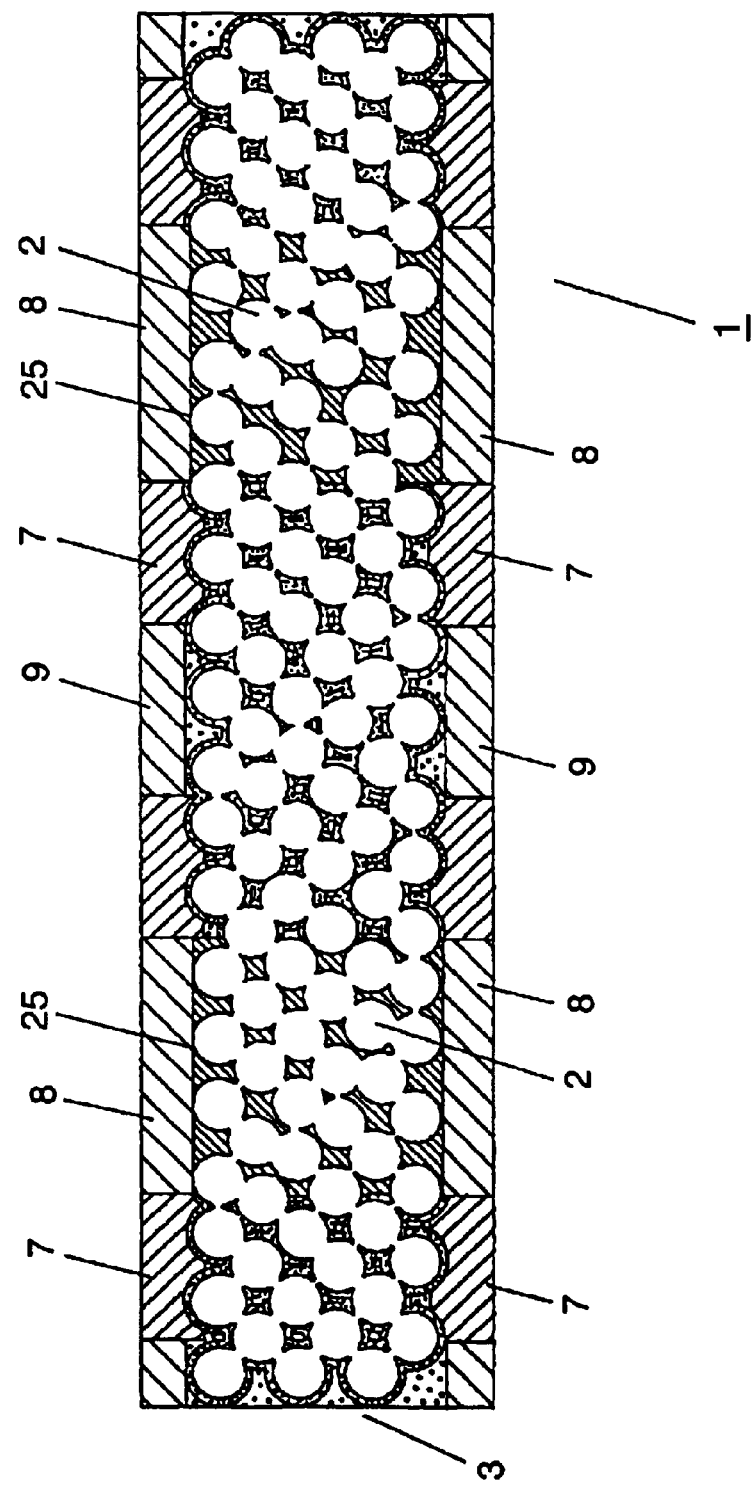
FIG. 9 is a cross-sectional view of the capacitor element of solid electrolytic capacitors in exemplary embodiments 3 and 8 of the present invention.

A description is given to a solid electrolytic capacitor in exemplary embodiment 3 of the present invention with reference to FIG. 9. As FIG. 9 shows, capacitor element 1 in the present exemplary embodiment comprises a valve metal sheet 3 prepared by forming a tantalum powder into a sheet-like shape followed by a sintering, a dielectric layer formed by an anodization on a portion other than an electrode exposure area 25, by preventing an invasion of forming solution by a resist film formed on the area of valve metal sheet 3, a solid electrolyte layer formed on the dielectric layer, the solid electrolyte layer being composed of a conductive polymer or a manganese dioxide or the like, a collector layer formed on the solid electrolyte layer, the collector layer comprising carbon and a silver paste, an insulating section 7 provided around the electrode exposure area 25, first connection terminal 8 connected to the electrode portion 2, which is located inside the insulating section 7, and second connection terminal 9 connected to the collector layer, which is provided around the insulating section 7.

The capacitor element thus structured is formed with package 11 as FIG. 1 shows, thereby completing a solid electrolytic capacitor.

The reason why such a sheet of sintered valve metal powder as described above is used is that a solid electrolytic capacitor with a larger capacitance can be obtained compared with the case where aluminum foil made porous by etching is used.

With respect to the structure of valve metal sheet 3, there is another method of forming electrode portion 2 by forming a through hole in the valve metal sheet 3 in advance besides the method of preventing the dielectric layer from being formed by employing a resist and the like as described above. In this case, a wall surface with no dielectric layer is formed inside of the through hole and a valve metal powder of the same kind is pressed into the through hole, thereby forming the electrode portion 2. As an alternate method of forming the electrode portion 2 is a method of forming a metal layer on the inner walls of the through hole by plating.

Exemplary Embodiment 4

A description is given to a solid electrolytic capacitor in exemplary embodiment 4 of the present invention with reference to FIG. 10 through FIG. 21.

Figure 10:
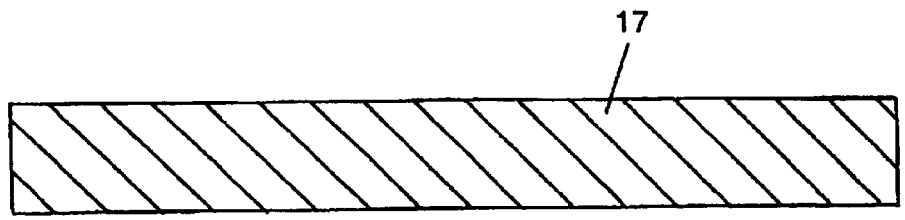
FIG. 10 is a cross-sectional view of aluminum foil in exemplary embodiment 4 of the present invention.
Figure 11:
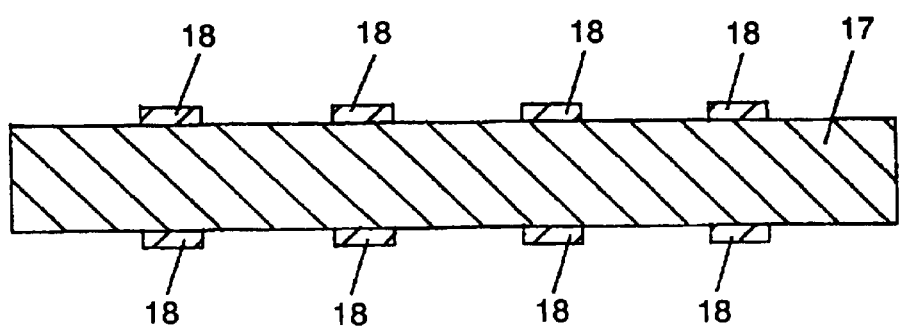
FIG. 11 is a cross-sectional view showing a state of a resist film formed on the aluminum foil in exemplary embodiment 4 of the present invention.

First, as FIG. 10 shows, aluminum foil 17 is prepared. Then, as FIG. 11 shows, resist films 18 composed of a chemical-resistant photo-resist, a masking tape and the like are formed on both surfaces of the aluminum foil 17 at positions where the electrode portions are formed and the resist films 18 thus formed are cured.

Figure 12:
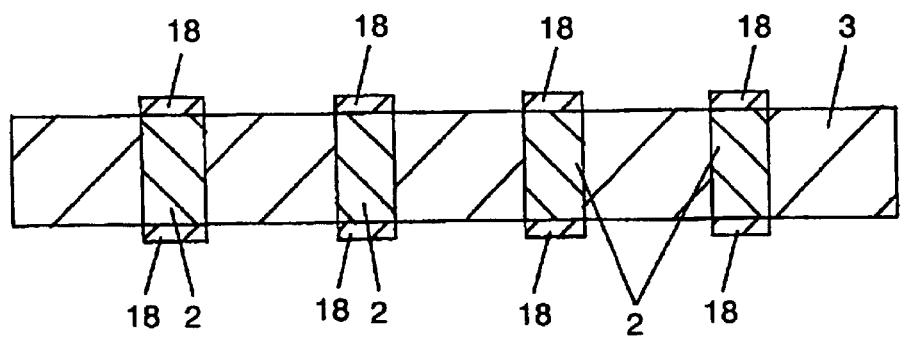
FIG. 12 is a cross-sectional view of a valve metal sheet by making aluminum foil porous, in exemplary embodiment 4 of the present invention.

Next, as FIG. 12 shows, the aluminum foil 17 with the resist film 18 formed is chemically etched to make the areas not covered with the resist film 18 porous. Thus, the valve metal sheet 3 with electrode portion 2 formed on the areas, where resist film 18 is formed, is produced.

Figure 13:
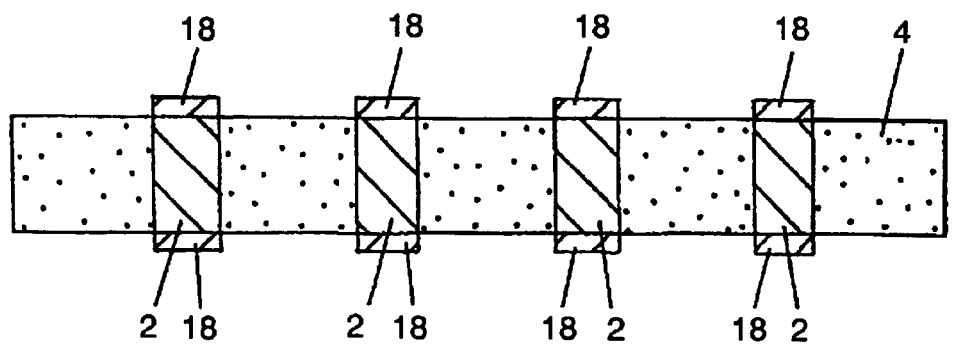
FIG. 13 is a cross-sectional view showing a state of a dielectric layer formed on the porous valve metal sheet in exemplary embodiment 4 of the present invention.

Subsequently, the valve metal sheet 3 with resist film 18 left thereon as FIG. 13 shows is anodized in a forming solution, thereby forming a dielectric layer 4 on the surface of the porous section of the valve metal sheet 3 except the area where electrode portion 2 is formed.

Figure 14:
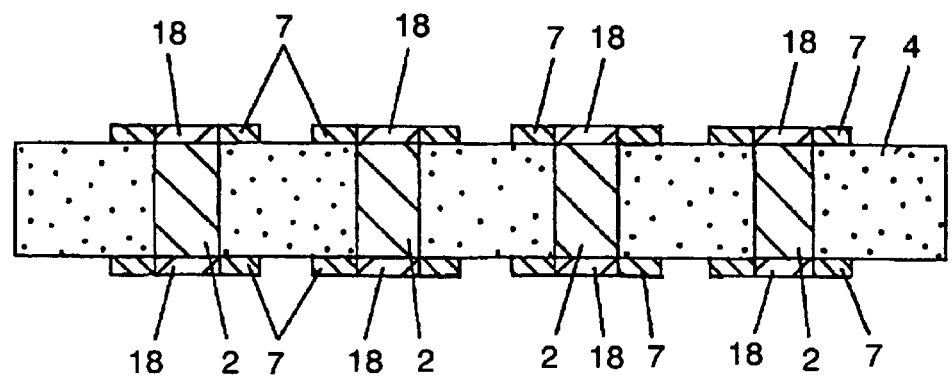
FIG. 14 is a cross-sectional view showing a state of an insulating section formed on the porous valve metal sheet in exemplary embodiment 4 of the present invention.

Then, as FIG. 14 shows, insulating section 7 is formed around the resist film 18 by a printing method and the like to prevent short-circuiting between the electrode portion 2 and the collector layer 6 to be formed later.

Figure 15:
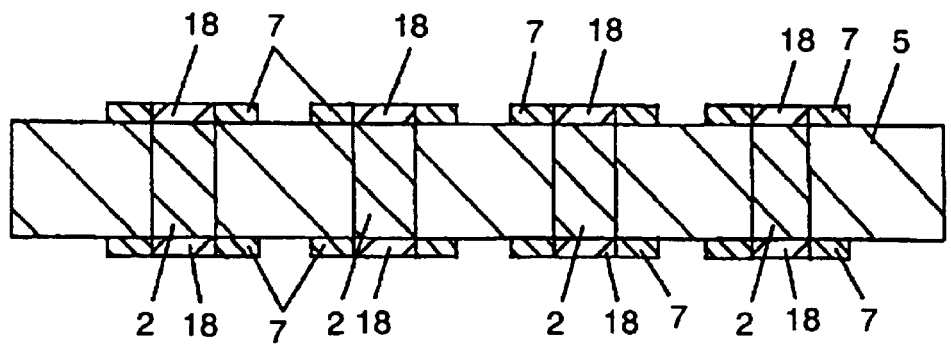
FIG. 15 is a cross-sectional view showing a state of a solid electrolyte layer formed on the porous valve metal sheet in exemplary embodiment 4 of the present invention.

Next, the valve metal sheet 3 with insulating section 7 is immersed in a solution containing pyrrole as FIG. 15 shows and then immersed in an oxidizing solution to have a thin polypyrrole layer formed on the dielectric layer 4 by chemical oxidation polymerization.

Further, the valve metal sheet 3 with the thin polypyrrole Layer formed is immersed in a solution containing pyrrole to have a sufficiently thick polypyrrole layer formed on the thin polypyrrole layer by an electrolytic polymerization. The electrolytic polymerization is performed with the polypyrrole layer serving as a positive electrode and an electrode in the solution as a negative electrode. In this way, a solid electrolyte layer 5 of sufficiently thick polypyrrole layer formed on the thin polypyrrole layer is formed.

Figure 16:
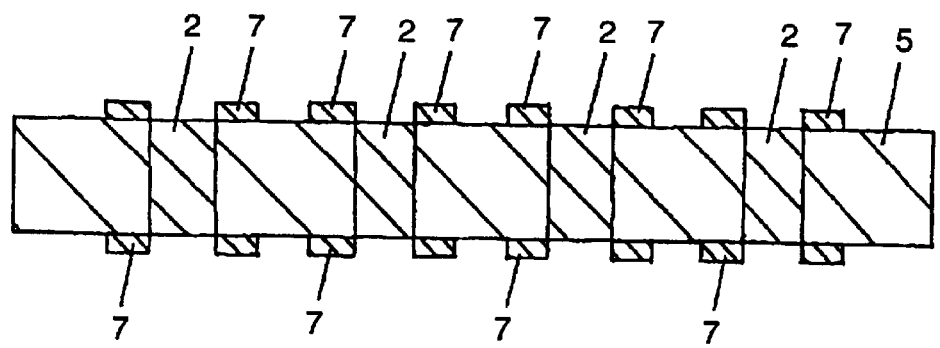
FIG. 16 is a cross-sectional view showing the state of the resist film removed from the porous valve metal sheet in exemplary embodiment 4 of the present invention.

The resist layer 18 is removed after collector layer 6 comprising a carbon layer, a silver paste layer and the like is formed on the solid electrolyte layer 5, as FIG. 16 shows.

Figure 17:
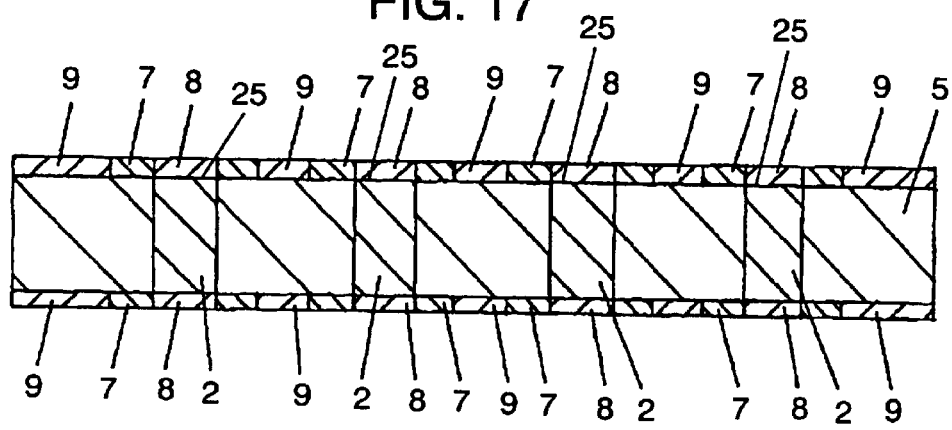
FIG. 17 is a cross-sectional view of a capacitor element having a first connection terminal and a second connection terminal formed on the valve metal sheet in exemplary embodiment 4 of the present invention.

Subsequently, as FIG. 17 shows, any one of electrode materials such as gold, silver, copper, nickel and the like is deposited on electrode exposure area 25 and collector layer 6 by methods such as a vacuum deposition, a sputtering, a plating and the like to form first connection terminal 8 formed on the electrode exposure area 25 and second connection terminal 9 on the collector layer 6, thereby completing capacitor element 1.

Figure 18:
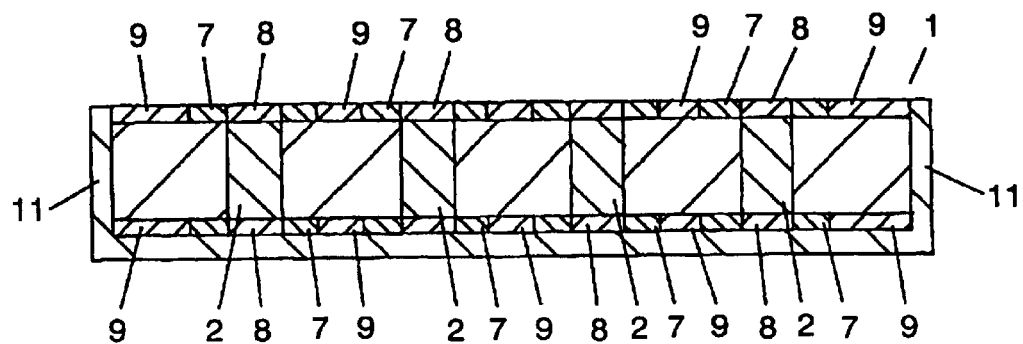
FIG. 18 is a cross-sectional view showing the state of a package formed around a periphery and beneath a bottom surface of the capacitor element in exemplary embodiment 4 of the present invention.

Then, as FIG. 18 shows, package 11 composed of epoxy resin and the like to serve as an electrically insulating layer is formed around a periphery and beneath a bottom surface of the capacitor element 1.

Figure 19:
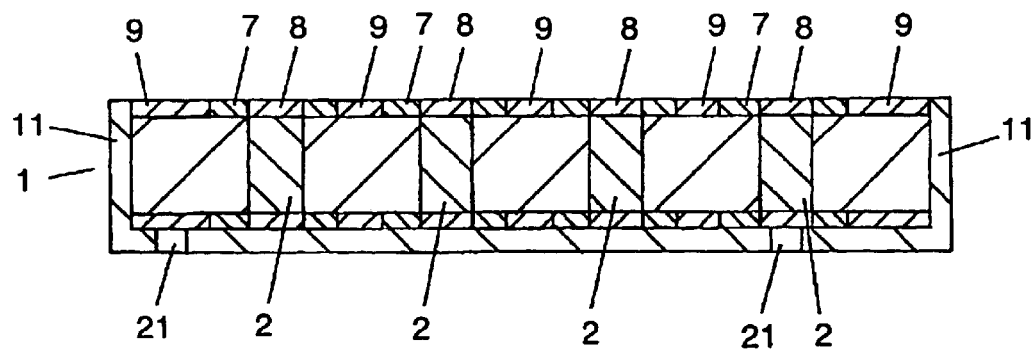
FIG. 19 is a cross-sectional view showing the state of a blind hole formed in the package beneath the bottom surface of the capacitor element in exemplary embodiment 4 of the present invention.

In order to form lead out electrodes, blind holes 21 are formed by an etching, a laser machining and the like as FIG. 19 shows.

Figure 20:
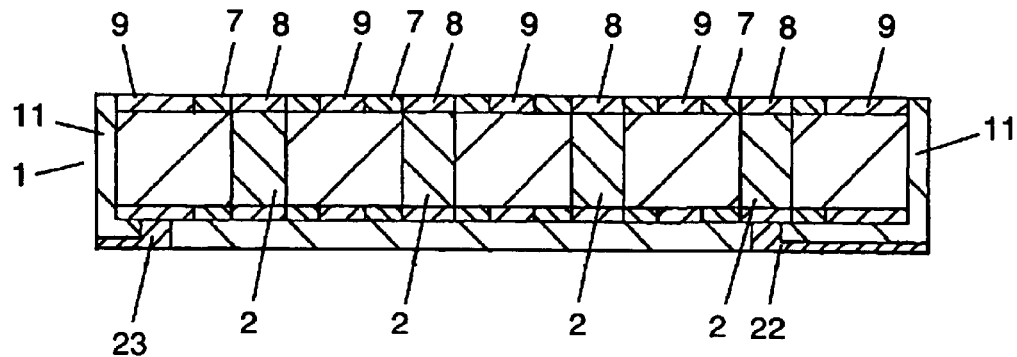
FIG. 20 is a cross-sectional view showing a state of the capacitor element further provided with lead out electrodes formed in the blind holes and an additional package to electrically insulate the lead out electrodes formed beneath the bottom surface in exemplary embodiment 4 of the present invention.

Electrodes 22 and 23 to electrically connect with the connection terminals 8 and 9 from the blind holes 21, respectively, are formed by a vacuum deposition, a sputtering, a plating and the like as FIG. 20 shows.

Figure 21:
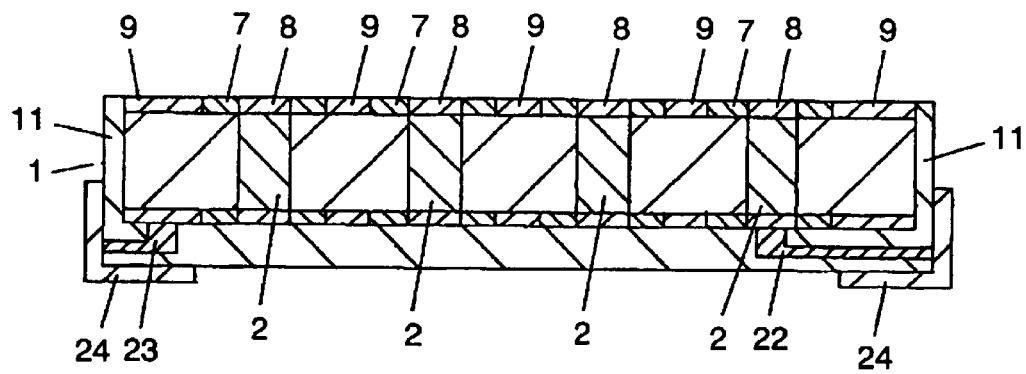
FIG. 21 is a cross-sectional view of a solid electrolytic capacitor obtained by providing external connection terminals on the capacitor element in exemplary embodiment 4 of the present invention.

And, for the purposes of an electrical insulation, a protection against external stresses to the bottom surface of capacitor element 1, and also enhancing the reliability and the like, package 11 is further formed on the previously applied package 11 by an injection molding of epoxy resin and the like. And external terminals 24 to electrically connect with lead out electrodes 22 and 23 formed on the periphery of capacitor element 1 are provided, as FIG. 21 shows, to completing a solid electrolytic capacitor.

As described above, according to a method of manufacturing solid electrolytic capacitors in the present exemplary embodiment, solid electrolytic capacitors with enhanced reliability are produced by applying a little improvement to the already well established production processes of a solid electrolytic capacitors employing an aluminum foil and a functional polymer.

Exemplary Embodiment 5

A description is given to a solid electrolytic capacitor in exemplary embodiment 5 of the present invention with reference to FIG. 22 through FIG. 29.

Figure 22:
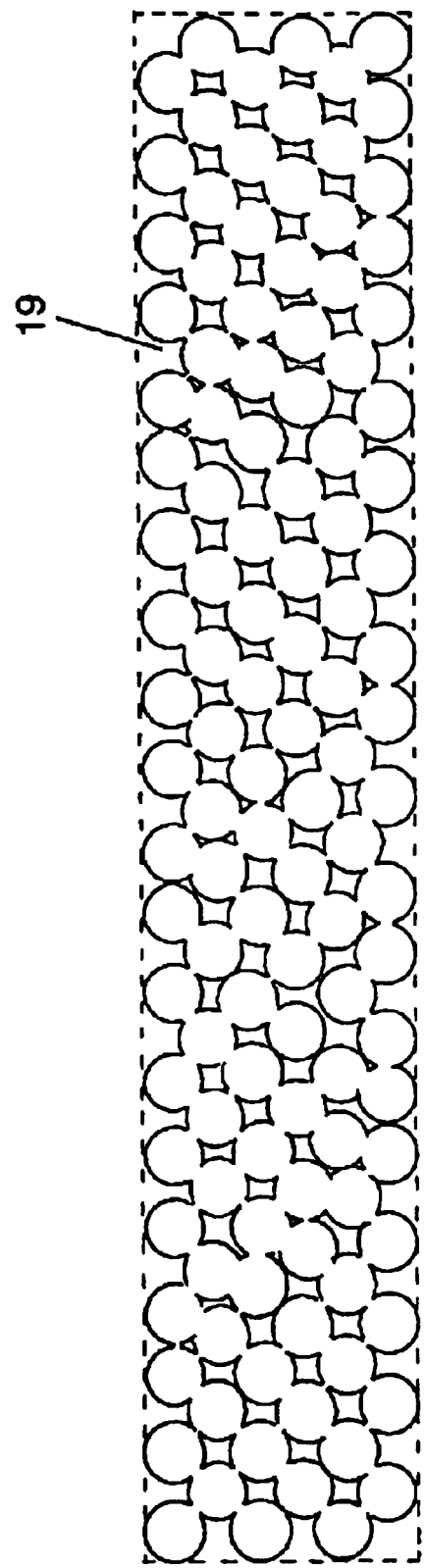
FIG. 22 is a cross-sectional view of a tantalum sintered body for describing a manufacturing method of a solid electrolytic capacitor in exemplary embodiment 5 of the present invention.

First, as FIG. 22 shows, a mixture of tantalum powder and a binder is kneaded and molded to a sheet-like shape. After subjected to a binder elimination process, the sheet-like molded shape is sintered at a predetermined temperature to obtain sheet-like shaped porous tantalum sintered body 19.

Figure 23:
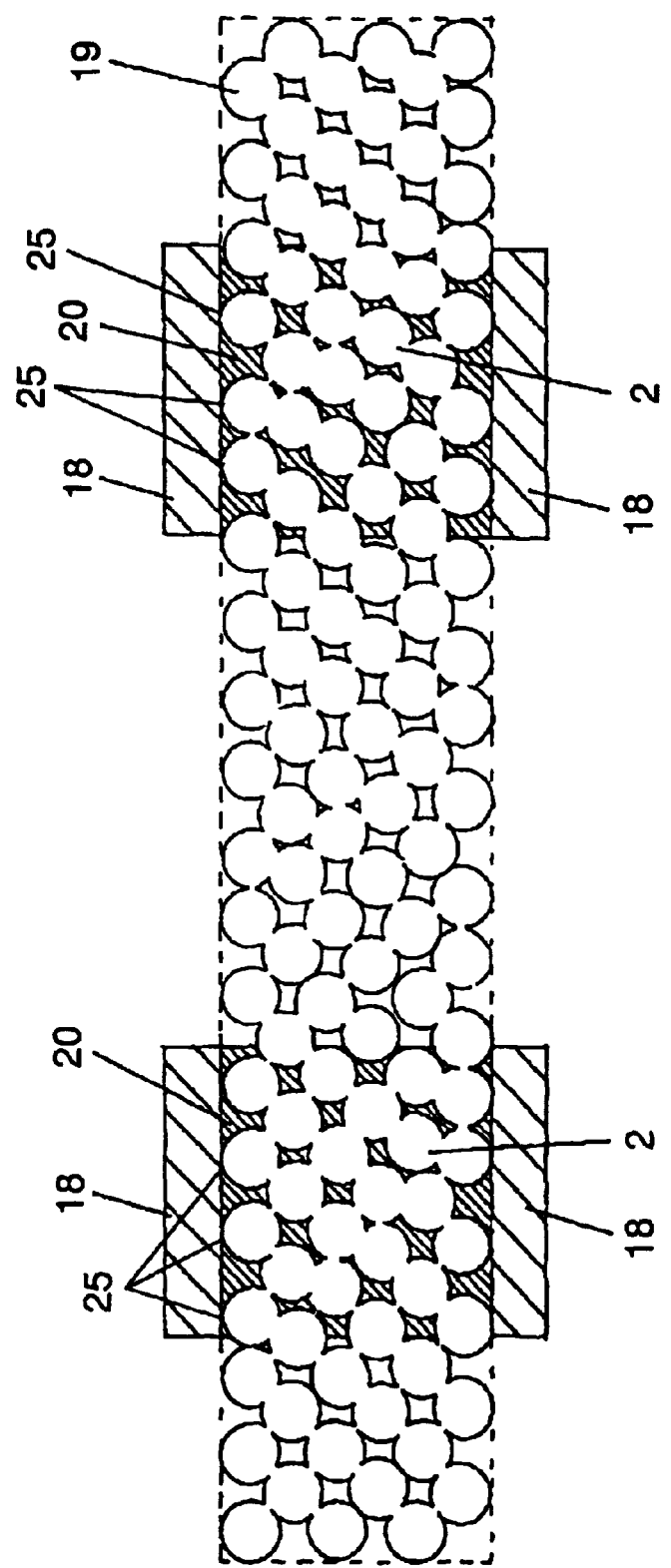
FIG. 23 is a cross-sectional view showing a step of forming electrode portions on the tantalum sintered body in exemplary embodiment 5 of the present invention.

Next, as FIG. 23 shows, resin material 20 such as epoxy resin and the like is impregnated at positions where electrode portion 2 is formed and also resist layer 18 is formed by printing at positions where electrode exposure area 25 is formed. Then, the resin material 20 and the resist layer 18 are cured.

Figure 24:
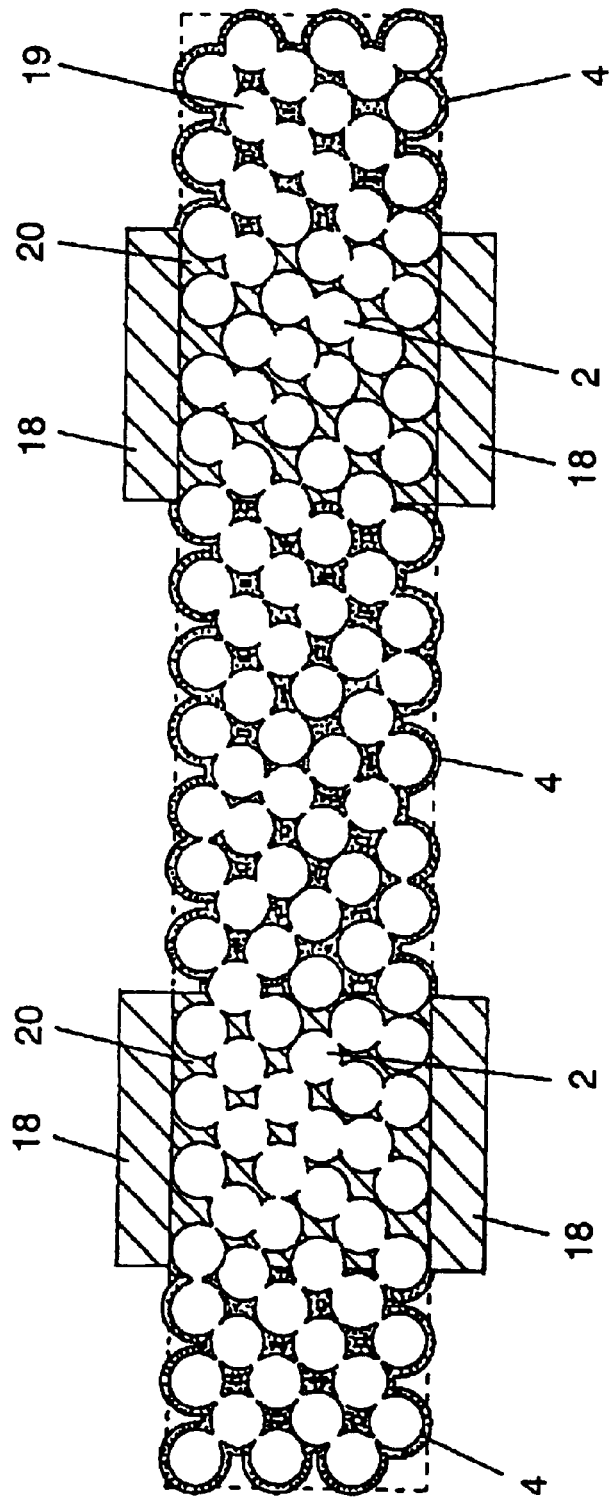
FIG. 24 is a cross-sectional view showing a state of a dielectric layer formed on the tantalum sintered body in exemplary embodiment 5 of the present invention.

Thereafter, as FIG. 24 shows, the tantalum sintered body 19 is subjected to an anodization process in a forming solution to form dielectric layer 4 on the porous sections except the areas for electrode portion 2.

Figure 25:
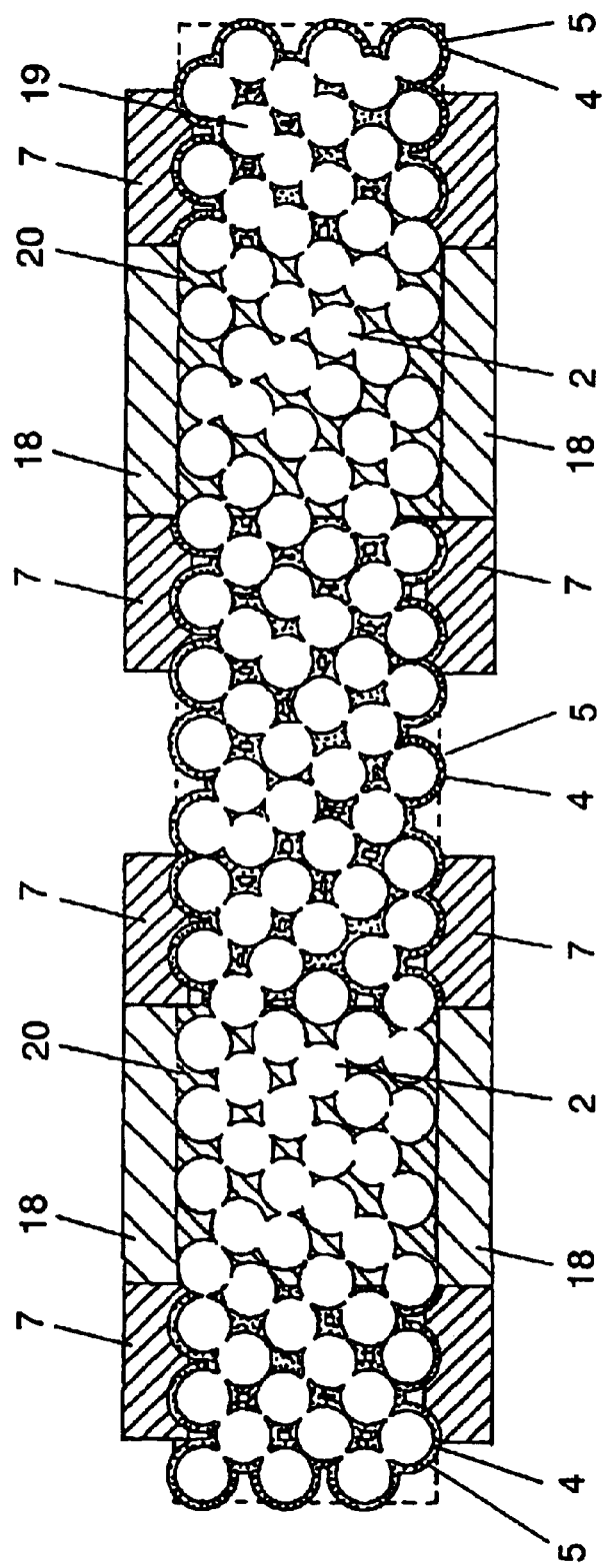
FIG. 25 is a cross-sectional view showing the state of an insulating section formed on the tantalum sintered body in exemplary embodiment 5 of the present invention.

Subsequently, as FIG. 25 shows, a resin layer is formed by a printing and the like method around resist layer 18 as mentioned above to form insulating section 7 and then, in the same manner as in exemplary embodiment 4, solid electrolyte layer 5 composed of polypyrrole is formed on the dielectric layer 4.

Figure 26:
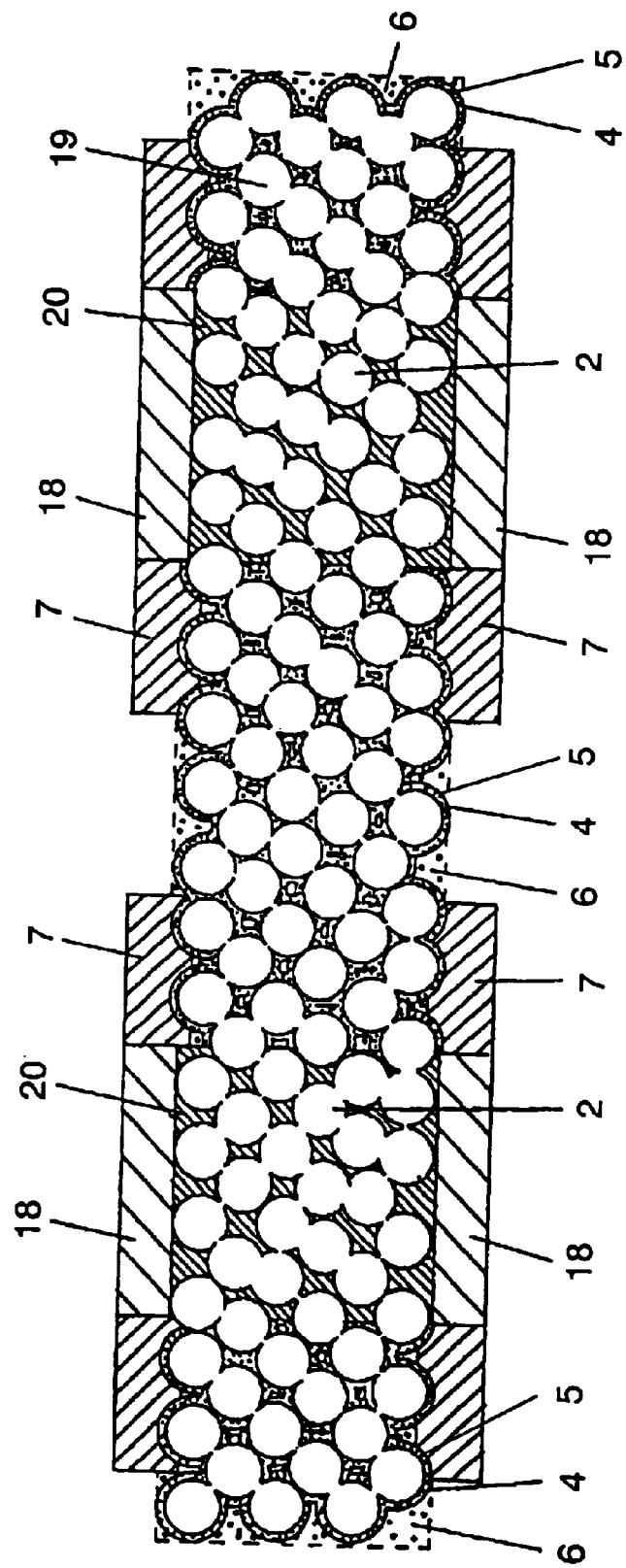
FIG. 26 is a cross-sectional view showing a state of a solid electrolyte layer and a collector layer formed on the tantalum sintered body in exemplary embodiment 5 of the present invention

Then, as FIG. 26 shows, collector layer 6 comprising a carbon layer, a silver paste layer and the like is formed on the solid electrolyte layer 5.

Figure 27:
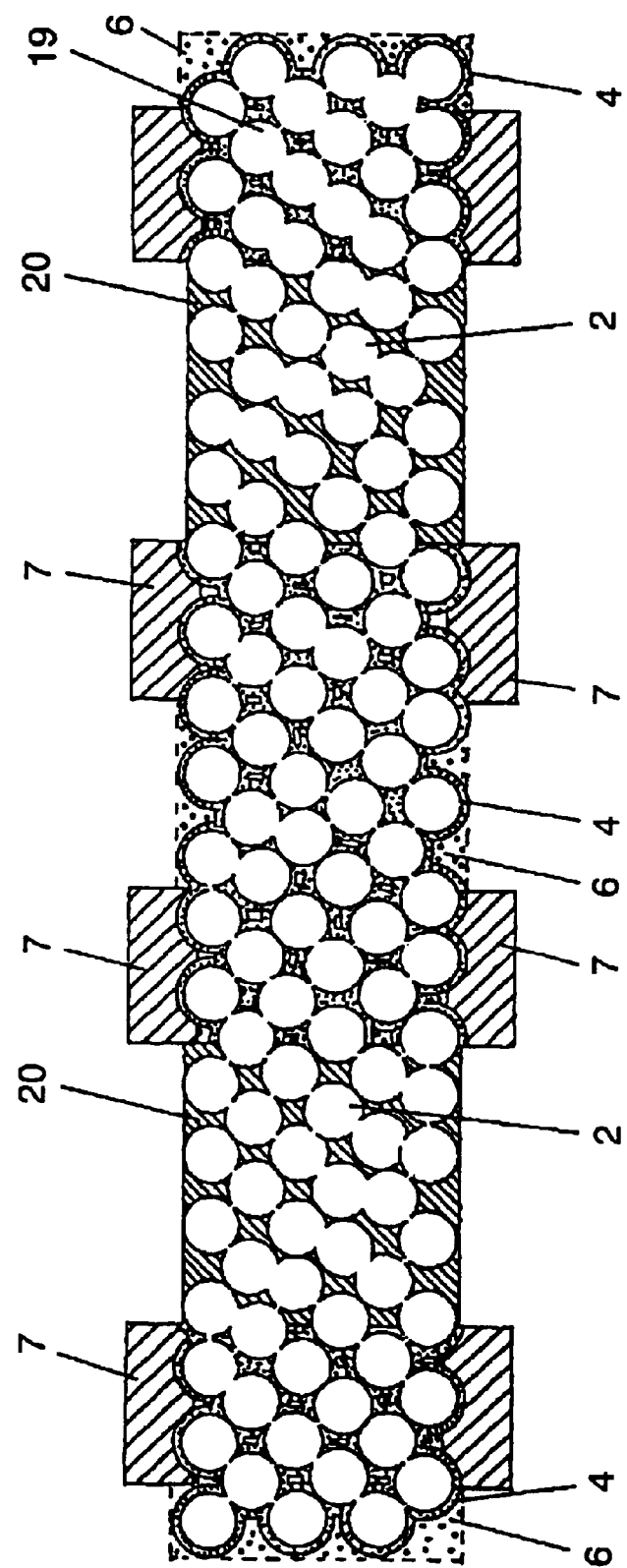
FIG. 27 is a cross-sectional view showing a state of the resist film removed in exemplary embodiment 5 of the present invention.
Figure 28:
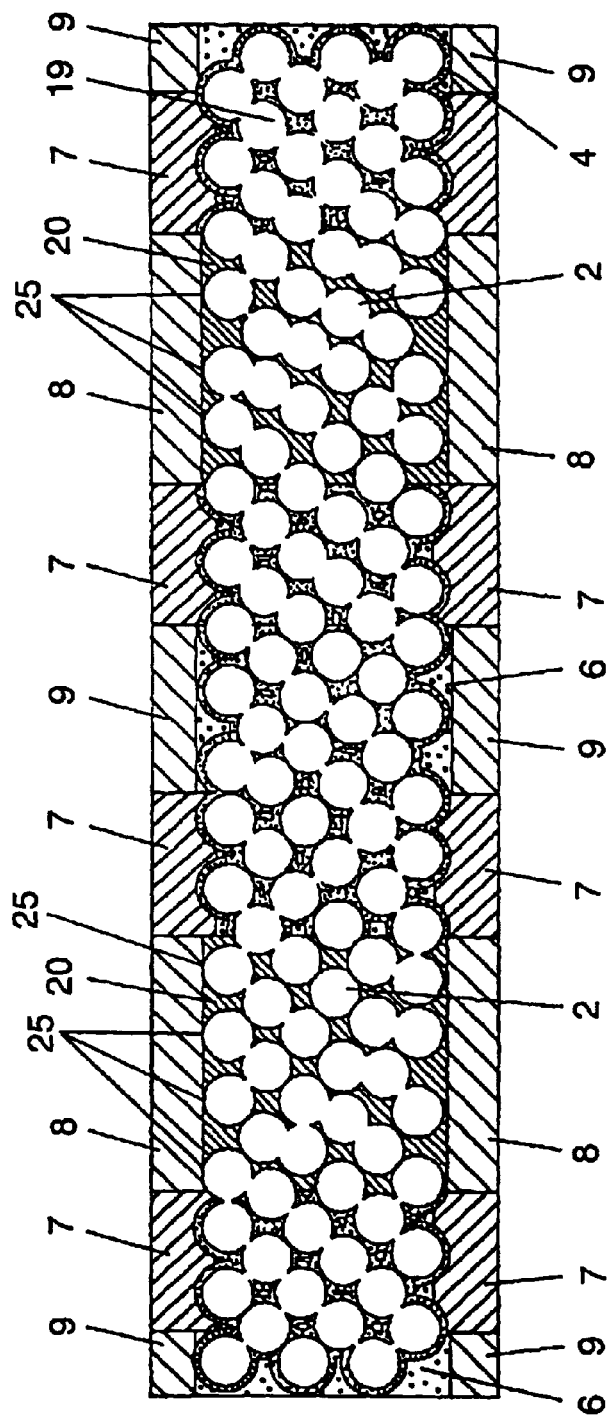
FIG. 28 is a cross-sectional view of a capacitor element in exemplary embodiment 5 of the present invention.

The resist film 18 is removed as FIG. 27 shows and then, as FIG. 28 shows, first connection terminal 8 and second connection terminal 9 are formed on the electrode exposure area 25 and the collector layer 6, respectively to form a capacitor element. The connection terminals are formed by any one layer of electrode materials such as gold, silver, copper, nickel and the like on an outer surface of the electrode portion 2 (i.e. electrode exposure area 25) by the methods such as a vacuum deposition, a sputtering, a plating and the like. The connection terminals 8 and 9 are separated and insulated by the insulating section 7.

Figure 29:
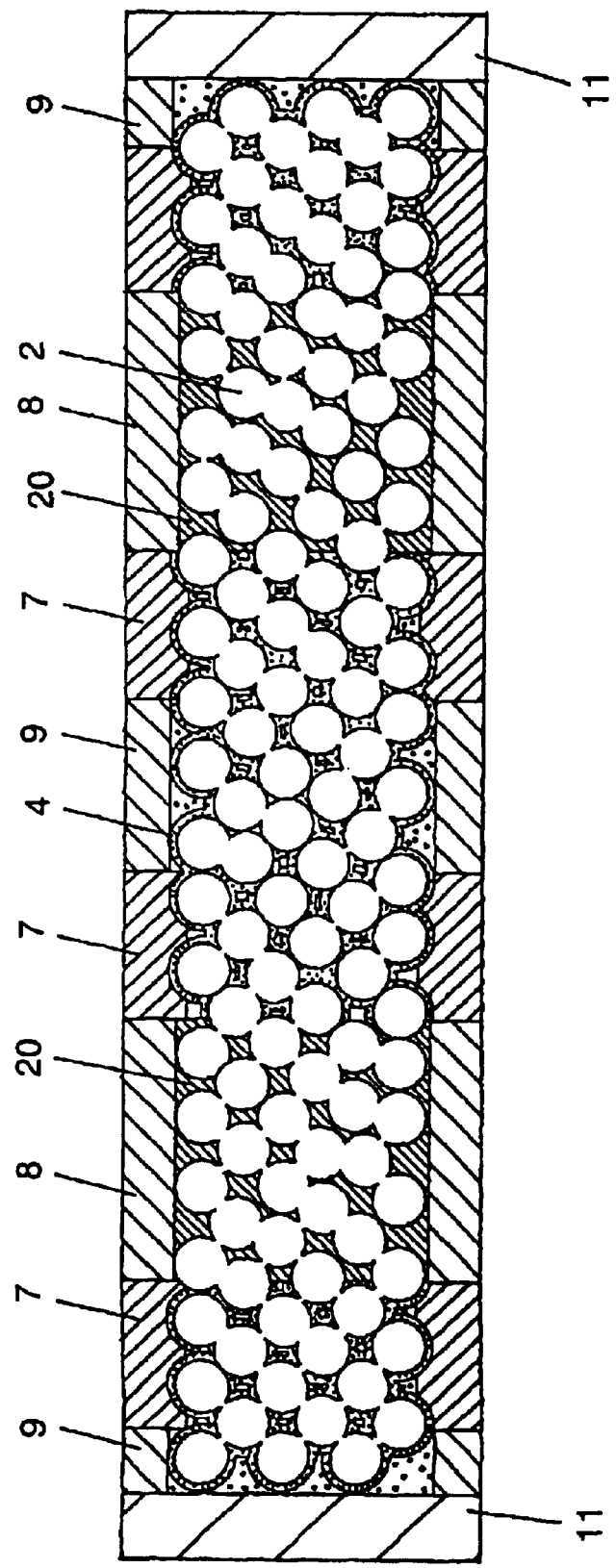
FIG. 29 is a cross-sectional view of a solid electrolytic capacitor produced by providing a package on the capacitor element in exemplary embodiment 5 of the present invention.

Finally, as FIG. 29 shows, package 11 is formed by injection molding of epoxy resin and the like, thereby completing the production of a solid electrolytic capacitor.

By employing sheet-like tantalum sintered body 19 as described above, a solid electrolytic capacitor with a higher capacitance can be produced in comparison with the solid electrolytic capacitor employing aluminum foil as described in exemplary embodiment 4 of the present invention.

Exemplary Embodiment 6

Figure 30:
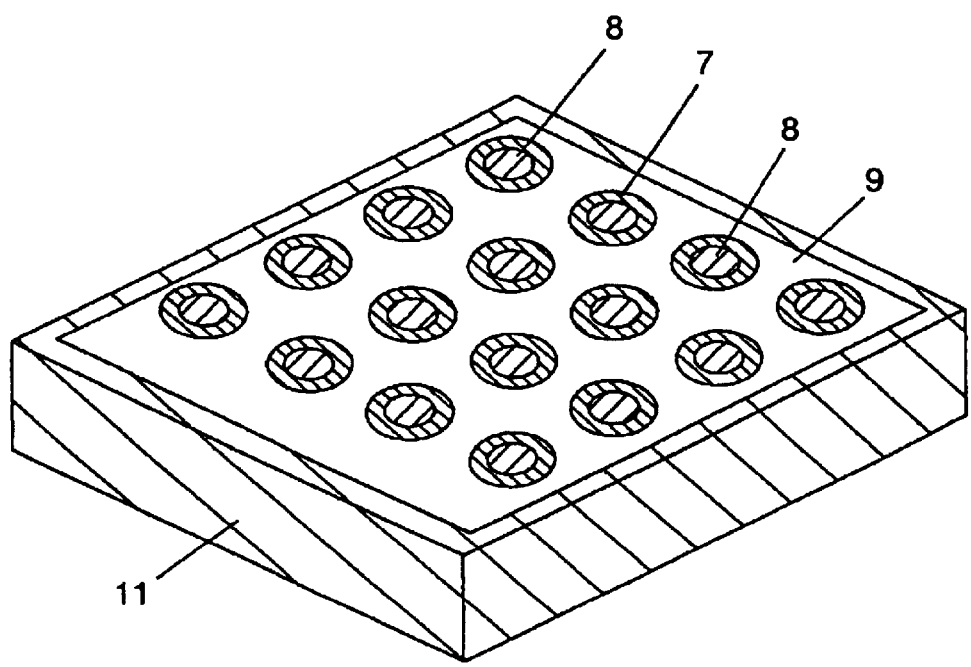
FIG. 30 is a perspective view of a solid electrolytic capacitor in exemplary embodiment 6 of the present invention.
Figure 31:
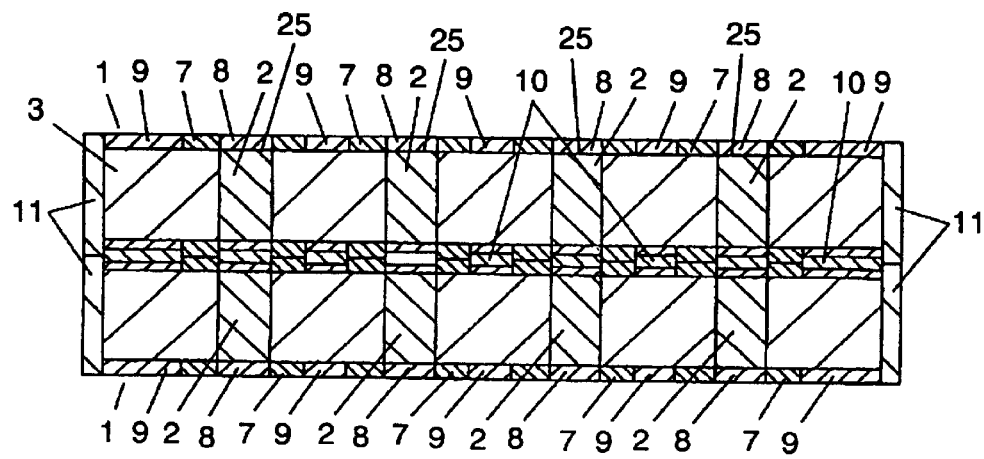
FIG. 31 is a cross-sectional view of the solid electrolytic capacitor in exemplary embodiment 6 of the present invention.

A description is given to a solid electrolytic capacitor in exemplary embodiment 6 of the present invention with reference to FIG. 30 and FIG. 31.

In FIG. 30 and FIG. 31, capacitor element I comprises valve metal sheet 3, which is made porous except the areas where a plurality of electrode portions 2 are located, dielectric layer 4 formed on a surface of the porous portion of the valve metal sheet 3, solid electrolyte layer 5 formed on the dielectric layer 4, collector layer 6 formed on the solid electrolyte layer 5, and insulating section 7 disposed between electrode exposure area 25 on a surface of the electrode portion 2 and the collector layer 6.

Although capacitor element 1 functions well even with the foregoing structure, it is preferred that an additional metal layer is formed on the electrode exposure area 25 to provide first connection terminal 8, and another additional metal layer is formed on the collector layer 6 surrounding the insulating section 7 to provide second connection terminal 9. Two of the capacitor element 1 thus structured are laminated with the first connection terminals 8 of one capacitor element connected to the first connection terminals 8 of another capacitor element by means of interlayer connecting material 10 of solder and the like. And also the second connection terminals 9 of one capacitor element are connected to the second connection terminals 9 of another capacitor element by means of interlayer connecting material 10 of solder and the like. And package 11 composed of epoxy resin and the like is formed around the periphery of the laminated body by molding, thereby producing a solid electrolytic capacitor. The structure of the capacitor element 1 and the materials used therein are the same as in exemplary embodiment 1 of the present invention.

The solid electrolytic capacitor structured as above has a plurality of connection terminals 8 and also connection terminals 9 on and beneath an upper and a bottom surfaces thereof as FIG. 30 and FIG. 31 show, thereby allowing a semiconductor device to be mounted on one surface thereof and another surface to be connected to a land of a circuit board.

At this time, the number of connection terminals 8 and 9 is made a same as or to exceed a number of connection bumps of the semiconductor device.

When the number of connection terminals 8 and 9 on one surface of the solid electrolytic capacitor exceeds the number of the connection bumps of the semiconductor device, chip components such as chip resistors, chip capacitors, chip inductors and the like are mounted thereon in addition to the semiconductor device, thereby allowing the whole assembly to be a kind of circuit module.

Thus, by making a solid electrolytic capacitor having a multi-layer structure, a higher capacitance can be obtained. At the same time, by having connection terminals 8 and connection terminals 9 disposed alternately, low ESR and low ESL as well can be obtained to allow the impedance characteristics at high frequencies to be improved greatly, resulting in realizing a solid electrolytic capacitor of excellent high frequency response.

Exemplary Embodiment 7

Figure 5:
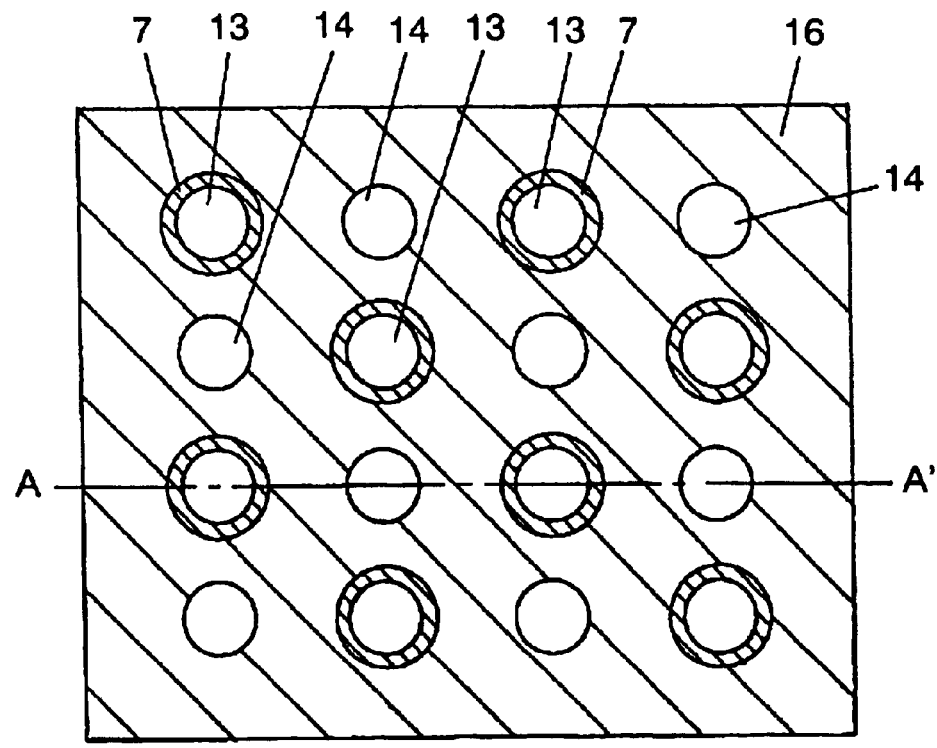
FIG. 5 is a top view of solid electrolytic capacitors in exemplary embodiments 2 and 7 of the present invention.
Figure 32:
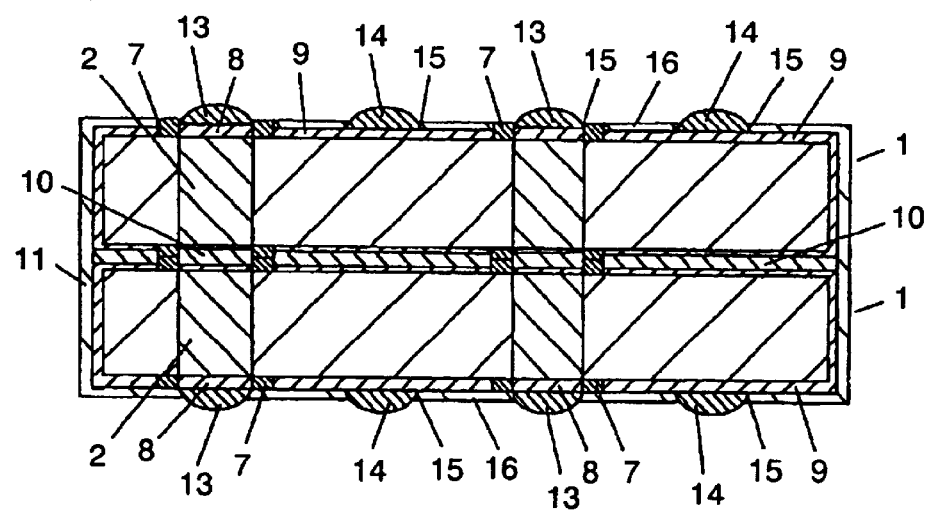
FIG. 32 is a cross-sectional view of a solid electrolytic capacitor in exemplary embodiment 7 of the present invention.

FIG. 5 is a top view of a solid electrolytic capacitor in exemplary embodiment 7 of the present invention. FIG. 32 is a cross-sectional view of the solid electrolytic capacitor of FIG. 5, FIG. 33 is a cross-sectional view of another solid electrolytic capacitor and FIG. 34 is a cross-sectional view of still another solid electrolytic capacitor.

The fundamental structure of the solid electrolytic capacitor in exemplary embodiment 7 of the present invention is the same as in exemplary embodiment 6 except that connection bumps 13 and 14 composed of gold, solder or tin are provided on the first connection terminal 8 and the second connection terminal 9 to facilitate the connection with the semiconductor device. In order to keep the bump pitches of connection bumps 13 and 14 constant, insulating film 16 with opening 15 provided at the places, where connection bumps 13 and 14 are formed, is formed and then connection bumps 13 and 14 are formed.

Figure 33:
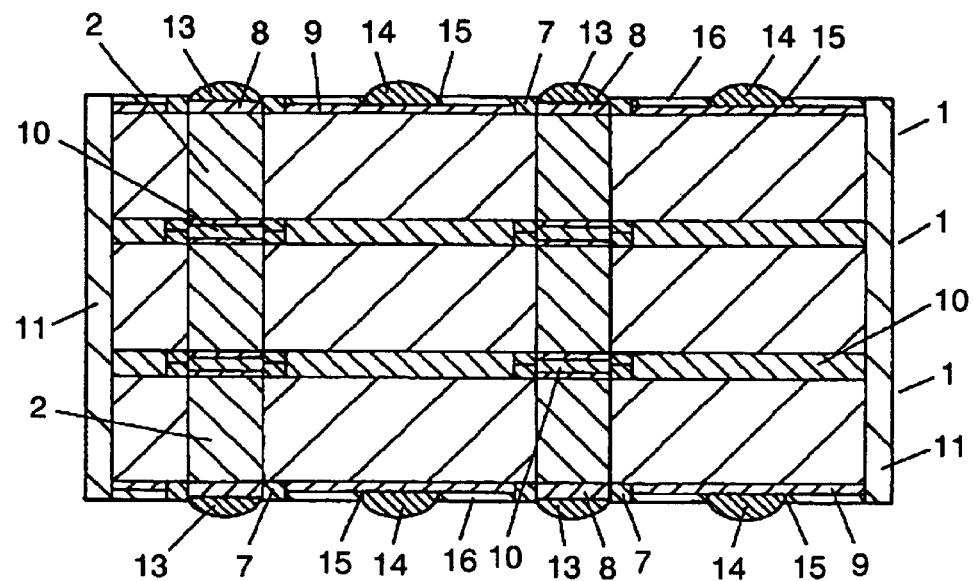
FIG. 33 is a cross-sectional view of another solid electrolytic capacitor in exemplary embodiment 7 of the present invention.
Figure 34:
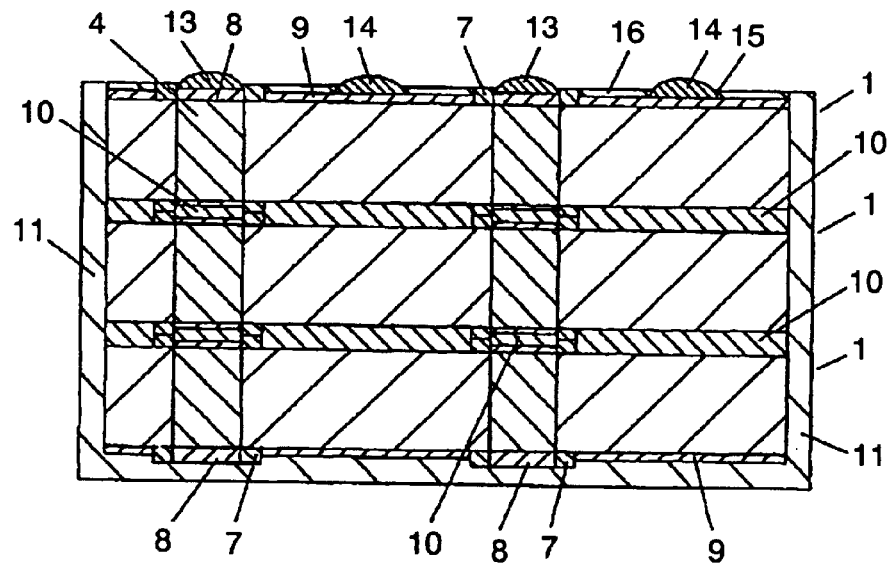
FIG. 34 is a cross-sectional view of still another solid electrolytic capacitor in exemplary embodiment 7 of the present invention.

FIG. 32 shows a solid electrolytic capacitor prepared by laminating two of the capacitor element 1 and FIG. 33 shows a solid electrolytic capacitor prepared by laminating three of the capacitor element 1. These solid electrolytic capacitors have connection bumps 13 and 14 provided on both respective surfaces.

In FIG. 33, as interlayer connecting material 10 to connect electrode portions 2, any one material selected from the group consisting of solder, a conductive adhesive and an anisotropic conductive sheet is used, and as interlayer connecting layer to connect collector layers 6, a conductive adhesive is used.

Meanwhile, FIG. 34 shows a solid electrolytic capacitor prepared by laminating three of the capacitor element 1 with connection bumps 13 and 14 provided only on the upper surface of the multi-layer capacitor. The bottom surface thereof is covered by package II, thereby allowing the multi-layer capacitor to be mounted on a circuit board with a high densely wiring patterns while an electrical insulation being maintained.

As described above, the solid electrolytic capacitor in the present exemplary embodiment facilitates the mounting of the semiconductor device thereon and also facilitates the mounting thereof on a circuit board due to the provision of connection bumps 13 and 14 on connection terminals 8 and 9, respectively.

Exemplary Embodiment 8

FIG. 9 is a cross-sectional view of capacitor element 1 in exemplary embodiment 8 of the present invention.

The capacitor element 1 in the present exemplary embodiment includes valve metal sheet 3 prepared by forming a tantalum powder into a sheet-like shape followed by a sintering process. By preventing a forming solution from invading into a portion where electrode portion 2 is formed, dielectric layer 4 is formed by anodization of the valve metal sheet 3 except the area where the electrode portion 2 is formed.

Then, solid electrolyte layer 6 composed of a conductive polymer, manganese dioxide or the like is formed on dielectric layer 4. Further, collector layer 6 comprising carbon or a silver paste is formed on the solid electrolyte layer 5, insulating section 7 is provided around the electrode exposure area 25 on a surface of the electrode portion 2, first connection terminal 8 connected to the electrode exposure area 25 is provided inside of insulating section 7 and second connection terminal 9 connected to the collector layer 6 is provided around the insulating section 7.

Up to these points, the structure described above is the same as in exemplary embodiment 3.

The necessary number of the capacitor element 1 thus prepared are laminated in the same manner as in exemplary embodiment 6 and package 11 is formed, thereby finishing the production of a solid electrolytic capacitor.

The reason why a valve metal powder is used is to obtain a higher capacitance for the resulting solid electrolytic capacitor in comparison with the solid electrolytic capacitor employing capacitor element 1 prepared by the use of valve metal sheet 3 composed of aluminum foil.

Exemplary Embodiment 9

First, in exemplary embodiment 9 of the present invention, one sheet of sheet-like capacitor element 1 is first prepared according to the steps shown in FIG. 10 through FIG. 21 in exemplary embodiment 4.

Figure 35:
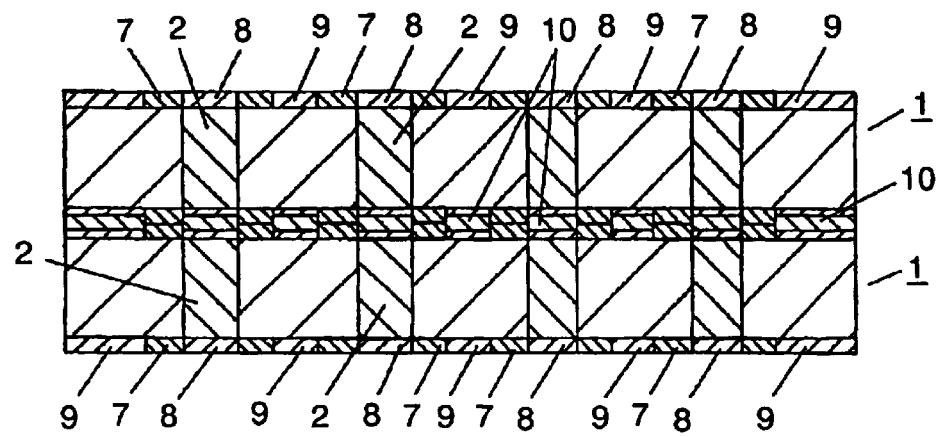
FIG. 35 is a cross-sectional view showing a state of capacitor elements laminated in exemplary embodiment 9 of the present invention.

Then, as FIG. 35 shows, two of capacitor element 1 are aligned in position to make positions of the first connection terminals 8 of the two capacitor element 1 to coincide with each other, and also to make positions of the second connection terminals 9 of the two capacitor element 1 to coincide with each other. Then, the two capacitor elements 1 are laminated and connected electrically and also mechanically with each other by means of interlayer connecting material 10, thereby obtaining a laminated body composed of two capacitor elements 1.

Figure 36:
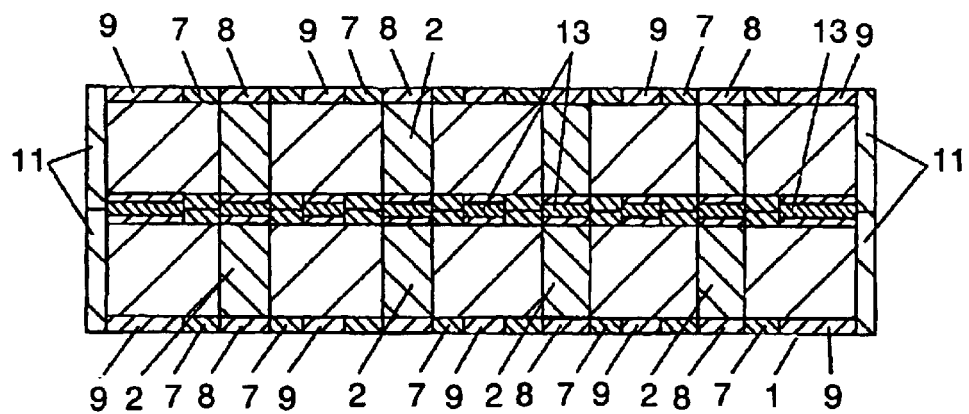
FIG. 36 is a cross-sectional view of a solid electrolytic capacitor in exemplary embodiment 9 of the present invention.

Finally, as FIG. 36 shows, for the purpose of electrical insulation and enhancing reliability by protecting the capacitor element 1 from the humid environment and external stresses, package 11 composed of epoxy resin and the like is formed by injection molding around the laminated body of capacitor element 1 to complete a solid electrolytic capacitor.

As described above, according to the method of manufacturing solid electrolytic capacitors in the present exemplary embodiment, solid electrolytic capacitors with excellent reliability can be produced by applying a little improvement to the established manufacturing process of a solid electrolytic capacitors employing a functional polymer and an aluminum foil.

Exemplary Embodiment 10

First, in exemplary embodiment 10 of the present invention, one sheet of capacitor element 1 is prepared according to the steps as described in FIG. 22 through FIG. 29 in exemplary embodiment 5.

Figure 37:
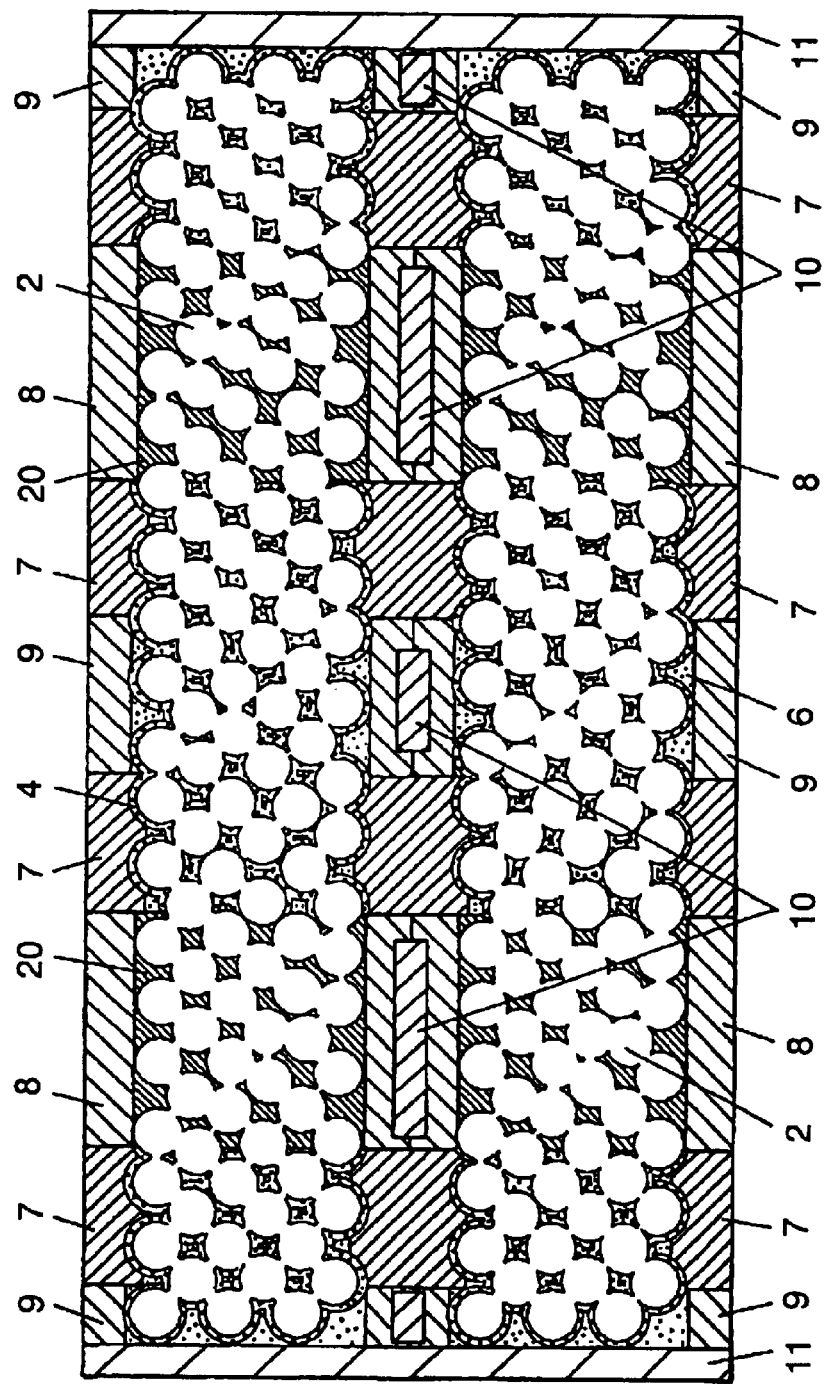
FIG. 37 is cross-sectional view of a solid electrolytic capacitor produced by laminating capacitor elements in exemplary embodiment 10 of the present invention.

Then, as FIG. 37 shows, two of the capacitor element 1 thus structured are laminated so as the positions of the first connection terminals 8 of the two capacitor elements 1 to coincide with each other and also the positions of the second connection terminals 9 of the two capacitor elements 1 to coincide with each other, and the two capacitor elements 1 are connected electrically and mechanically as well with each other by means of interlayer connecting material 10. And finally package 11 composed of epoxy resin and the like is formed by an injection molding around a periphery of the laminated body of the capacitor elements 1 to completing a solid electrolytic capacitor.

As described above, by employing a method of using sheet-like tantalum sintered body 19, a solid electrolytic capacitors with a higher capacitance in comparison with the solid electrolytic capacitors using aluminum foil as described in exemplary embodiment 9 of the present invention can be produced.

INDUSTRIAL USABILITY

A solid electrolytic capacitor of the present invention can produce a module excellent in high frequency response since a direct mounting of a semiconductor device on the surface thereof is possible. Further, the solid electrolytic capacitor of the present invention makes it possible to realize a reduction in size while achieving a high capacitance.

What is claimed is:

1. A solid electrolytic capacitor comprising:
   a valve metal sheet having a porous section;
   an electrode exposure area formed on a surface of said valve metal sheet;
   a dielectric layer foamed on said porous section of said valve metal sheet;
   a solid electrolyte layer formed on said dielectric layer;
   a collector layer formed on said solid electrolyte layer; and
   an insulating section to electrically insulate said electrode exposure area from said collector layer,
   wherein said electrode exposure area and said collector layer are located on a same surface of said valve metal sheet.

2. The solid electrolytic capacitor according to claim 1, wherein said valve metal sheet comprises any one of aluminum foil and a sintered body of a valve metal powder.

3. The solid electrolytic capacitor according to claim 1, wherein said electrode exposure area is any one of an outer surface of a sintered body of a valve metal powder and an outer surface of a though hole formed in a sintered body of a valve metal powder.

4. The solid electrolytic capacitor according to claim 1, wherein said solid electrolyte layer is at least one of a conductive polymer and manganese dioxide.

5. The solid electrolytic capacitor according to claim 1, further comprising:
   a first connection terminal connecting to said electrode exposure area; and
   a second connection terminal connecting to said collector layer.

6. The solid electrolytic capacitor according to claim 1, wherein said electrode exposure urea, dielectric layer, solid electrolyte layer, collector layer and insulating section are formed on both surfaces of said valve metal sheet.

7. The solid electrolytic capacitor according to claim 6, further comprising:
   a first connection terminal connecting to said electrode exposure area; and
   a second connection terminal connecting to said collector layer.

8. The solid electrolytic capacitor according to claim 7, wherein said first connection terminal and second connection terminal are formed on both surfaces of said valve metal sheet.

9. The solid electrolytic capacitor according to claim 5, wherein said first connection terminal in any one of additional metal layers formed on said electrode exposure area and on a roughened surface of said electrode exposure area.

10. The solid electrolytic capacitor according to claim 5, wherein said second connection terminal is a metal layer formed on said collector layer.

11. The solid electrolytic capacitor according to claim 5, wherein said second connection terminal is a metal layer located in an opening of said insulating section formed on said collector layer.

12. The solid electrolytic capacitor according to claim 5, wherein each of said first connection terminal and said second connection terminal is a connection bump.

13. The solid electrolytic capacitor according to claim 1, wherein a cross-sectional area of an electrode portion inside said valve metal sheet is smaller than an area of said electrode exposure area.

14. The solid electrolytic capacitor according to claim 1, further comprising a package.

15. A Method of manufacturing solid electrolytic capacitors comprising the steps of:
   forming a resist layer on a portion of a valve metal sheet surface, said portion being an electrode exposure a;
   forming a porous section in said valve metal sheet;
   forming a dielectric layer on said porous section;
   forming an insulating section around said resist layer;
   forming a solid electrolyte layer on said dielectric layer; and
   forming a collector layer on said solid electrolyte layer.

16. A method of manufacturing solid electrolytic capacitors comprising the steps of:
   sintering a valve metal powder to form a valve metal sheet;
   forming a dielectric layer in said valve metal sheet except an area to be an electrode exposure area;
   forming an insulating section around said electrode exposure area;
   forming a solid electrolyte layer on said dielectric layer; and
   forming a collector layer on said solid electrolyte layer.

17. The method of manufacturing solid electrolytic capacitors according to claim 16, further comprising:
   providing a through hole; and
   forming an electrode portion in said through hole.

18. A solid electrolytic capacitor comprising a laminate of a plurality of capacitor elements, each of said capacitor elements comprising:
   a valve metal sheet having a porous section;
   an electrode exposure area formed on a surface of said valve metal sheet;
   a dielectric layer formed on said pots section of said valve metal sheet;
   a solid electrolyte layer formed on said dielectric layer;
   a collector layer formed on said solid electrolyte layer; and
   an insulating section to electrically insulate said electrode exposure area from said collector layer, wherein said electrode exposure area and said collector layer are located on a same surface of said valve metal sheet.

19. The solid electrolyte capacitor according to claim 18, wherein electrode exposure areas of one of said plurality of capacitor elements are electrically connected to electrode exposure areas of other capacitor element, and collector layers of one of said plurality of capacitor elements are electrically connected to collector.

20. The solid electrolytic capacitor according to claim 18, wherein said valve metal sheet comprise any one of aluminum foil and a sintered body of a valve metal powder.

21. The solid elect capacitor according to clam 18, wherein said electrode exposure area is any one of an outer surface of a sintered body of a valve metal powder and an outer surface of a through hole formed in a sintered body of a valve metal powder.

22. The solid electrolytic capacitor according to claim 18, wherein said solid electrolyte layer is a conductive polymer.

23. The solid electrolytic capacitor according to claim 18, further comprising:
a first connection terminal connecting to said electrode exposure area; and
a second connection terminal connecting to said collector layer.

24. The solid electrolytic capacitor according to claim 23, wherein said first connection terminal and said second connection terminal are formed on both surfaces of said capacitor element.

25. The solid electrolytic capacitor according to claim 23, wherein said first connection terminal is any one of additional metal layers formed on said electrode exposure area and on a roughened surface of said electrode exposure area.

26. The solid electrolytic capacitor according to claim 23, wherein said second connection terminal is a metal layer formed on said collector layer.

27. The solid electrolytic capacitor according to claim 23, wherein said second connection terminal is a metal layer located in an opening of said insulating section formed on said collector layer.

28. The solid electrolytic capacitor according to claim 23, wherein each of said first connection terminal and said second connection terminal is a connection bump.

29. The solid electrolytic capacitor according to claim 19, wherein a material to electrically connect said electrode exposure areas of one of said plurality of capacitor elements to said electrode exposure areas of other capacitor element and a material to electrically connect said collector layers of one of said plurality of capacitor elements to said collector layers of other capacitor element are any one selected from a group consisting of a solder, a conductive adhesive, an anisotropic conductive adhesive and a conductive polymer.

30. The solid electrolytic capacitor according to claim 18, further comprising a package.

31. A method of manufacturing solid electrolytic capacitors comprising:
forming a resist layer on a portion of a valve metal sheet surface, said portion being an electrode exposure area;
forming a porous section in said valve metal sheet;
forming a dielectric layer on said porous section;
forming an insulating section around said resist layer;
forming a solid electrolyte layer on said dielectric layer;
forming a capacitor element by forming a collector layer on said solid electrolyte layer; and
laminating a plurality of said capacitor elements with electrode exposure areas of one of said plurality of capacitor elements being electrically connected to electrode exposure areas of other capacitor element, and collector layers of one of said plurality of capacitor elements being electrically connected to collector layers of other capacitor element.

32. The method of manufacturing solid electrolyte capacitor according to claim 31, wherein said valve metal sheet is any one of aluminum foil and a sintered body of a valve metal powder.

33. The method of manufacturing solid electrolytic capacitors according to claim 32, further comprising:
providing a through hole in said valve metal sheet; and
forming an electrode portion in said through hole.

* * * * *

UNITED STATES PATENT AND TRADEMARK OFFICE
CERTIFICATE OF CORRECTION

PATENT NO. : 6,775,125 B2
DATED : August 10, 2004
INVENTOR(S) : Suzushi Kiumura et al.

It is certified that error appears in the above-identified patent and that said Letters Patent is hereby corrected as shown below:

Column 11,
Line 32, change "foamed" to -- formed --.

Column 12,
Line 27, change "Method" to -- method --;
Line 30, change "a;" to -- area; --.
Line 60, change "pots" to -- porous --.

Column 13,
Line 9, after "collector" insert -- layers of other capacitor elements --.
Line 11, change "comprise" to -- comprises --.
Line 13, change "elect" to -- electrolytic --.

Signed and Sealed this

Twenty-eighth Day of December, 2004

JON W. DUDAS
*Director of the United States Patent and Trademark Office*